US008401253B2

(12) United States Patent
Yamada et al.

(10) Patent No.: US 8,401,253 B2
(45) Date of Patent: Mar. 19, 2013

(54) DISTINGUISHING TRUE 3-D FACES FROM 2-D FACE PICTURES IN FACE RECOGNITION

(75) Inventors: Miki Yamada, Kanagawa (JP); Osamu Yamaguchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 9 days.

(21) Appl. No.: 13/232,710

(22) Filed: Sep. 14, 2011

(65) Prior Publication Data

US 2012/0063671 A1   Mar. 15, 2012

Related U.S. Application Data

(63) Continuation of application No. PCT/JP2009/059805, filed on May 28, 2009.

(51) Int. Cl.
  *G06K 9/00*   (2006.01)
(52) U.S. Cl. .......................... 382/118; 382/154
(58) Field of Classification Search .................. None
  See application file for complete search history.

(56) References Cited

U.S. PATENT DOCUMENTS

| 5,982,912 | A | 11/1999 | Fukui et al. | |
|---|---|---|---|---|
| 6,922,478 | B1 * | 7/2005 | Konen et al. | 382/115 |
| 6,999,606 | B1 * | 2/2006 | Frischholz | 382/118 |
| 7,027,617 | B1 * | 4/2006 | Frischholz | 382/107 |
| 7,158,657 | B2 | 1/2007 | Okazaki et al. | |
| 7,224,835 | B2 | 5/2007 | Maeda et al. | |
| 7,650,017 | B2 * | 1/2010 | Yamada | 382/107 |
| 7,848,547 | B2 | 12/2010 | Takeguchi et al. | |
| 8,290,220 | B2 * | 10/2012 | Uchida | 382/118 |
| 2007/0071289 | A1 | 3/2007 | Takeguchi et al. | |

FOREIGN PATENT DOCUMENTS

| JP | 2003-99763 | 4/2003 |
|---|---|---|
| JP | 3822483 | 6/2006 |
| JP | 2007-304801 | 11/2007 |

OTHER PUBLICATIONS

Kollreider et al. (Oct. 2005) "Evaluating liveness by face images and the structure tensor." Proc. 4th IEEE Workshop on Automatic Identification Advanced Technologies, pp. 75-80.*
Li et al. (2010) "A binocular framework for face liveness verification under unconstrained localization." Proc. 9th Int'l Conf. on Machine Learning and Applications, pp. 204-207.*
Pan et al. (Dec. 2008) "Liveness detection for face recognition." Recent Advances in Face Recognition, Delac et al., Eds., p. 236.*
DeMarsico et al. (Apr. 2012) "Moving face spoofing detection via 3d projective invariants." Proc. 5th IAPR Int'l Conf. on Biometrics, pp. 73-78.*

(Continued)

Primary Examiner — Barry Drennan
(74) Attorney, Agent, or Firm — Finnegan, Henderson, Farabow, Garrett & Dunner, L.L.P.

(57) ABSTRACT

According to one embodiment, an image processing device includes an obtaining unit configured to obtain a plurality of images captured in time series; a first calculating unit configured to calculate a first change vector indicating a change between the images in an angle representing a posture of a subject included in each of the images; a second calculating unit configured to calculate a second change vector indicating a change in coordinates of a feature point of the subject; a third calculating unit configured to calculate an intervector angle between the first change vector and the second change vector; and a determining unit configured to determine that the subject is three-dimensional when the intervector angle is smaller than a predetermined first threshold.

9 Claims, 13 Drawing Sheets

OTHER PUBLICATIONS

Li et al. (Aug. 2004) "Live face detection based on the analysis of Fourier spectra." Proc. SPIE vol. 5404, pp. 296-303.*

Xu et al., Chapter 2 of "Three-dimensional vision," Kyoritsu Shuppan (1998), pp. 20-22, and English-language translation thererof.

International Search Report from Japanese Patent Office for International Application No. PCT/JP2009/059805, Mailed Jul. 14, 2009.

Mita, T. et al., "Joint Haar-like Features for Face Detection," in Proc. Tenth IEEE International Conference on computer Vision (ICCV 2005), Beijing, China, pp. 1619-1626, 2005).

Mita, T. et al., "Joint Haar-like Features Based on Feature Co-occurrence for Face Detection," Journal of the Institute of Electronics, Information and Communication Engineers, vol. J89-D-II, No. 8, pp. 1791-1801, (2006).

Yuasa, M. et al., "An Efficient 3D Geometrical Consistency Criterion for Detection of a Set of Facial Feature Points," In Proc. IAPR Conf. on Machine Vision Applications (MVA2007), Tokyo, Japan, pp. 25-28, (2007).

Yuasa, M. et al., "Automatic Facial Feature Point Detection for Face Recognition from a Single Image," Technical Report of the Institute of Electronics, Information, and Communication Engineers, PRMU2006-2, pp. 5-10, (2007).

Yamada, M. et al., "Head Pose Estimation using the Factorization and Subspace Method," Technical Report of the Institute of Electronics, Information, and Communication Engineers, PRMU2001-194, pp. 1-8, (2002).

* cited by examiner

HUMAN FACE

FACE IN PHOTOGRAPH $a_0, x_0$ : ANGLE, MIDPOINT OF NOSTRILS
(CURRENT VALUES)
$a_1$ : CLOSEST TO MIDPOINT
$x_1$ : x ASSOCIATED WITH $a_1$
$a_2, x_2$ : POINT PREVIOUS BY $u_i = a_i - a_{i+1}$
$v_i = x_i - x_{i+1}$ $\dfrac{u_0 \cdot v_0}{|u_0||v_0|} >$ CONSTANT 1    $\dfrac{u_1 \cdot v_1}{|u_1||v_1|} >$ CONSTANT 2

$\dfrac{u_0 \cdot u_1}{|u_0||u_1|} >$ CONSTANT 3    $\dfrac{v_0 \cdot v_1}{|v_0||v_1|} >$ CONSTANT 4

DISTINGUISHING TRUE 3-D FACES FROM 2-D FACE PICTURES IN FACE RECOGNITION

CROSS-REFERENCE TO RELATED APPLICATIONS

This application is a continuation of PCT international application Ser. No. PCT/JP2009/059805 filed on May 28, 2009 which designates the United States; the entire contents of which are incorporated herein by reference.

FIELD

The present invention relates to an image processing device, an image processing method and a computer program product.

BACKGROUND

Systems (personal identification systems) that capture a human face with an imaging device and perform personal identification have been more and more widespread and are beginning to be used for entrance/exit management, login to terminals and the like. With such a personal identification system, there is no risk of theft as compared to a personal identification system that performs personal identification using a password or a portable card, but instead, there is a risk of "impersonation" of impersonating an authorized user in a photograph by illegally obtaining the photograph of the face of the user and holding the photograph over the imaging device. If the impersonation can be automatically detected and appropriately ruled out, the security level of the entire personal identification system can be raised. A number of methods for detecting such impersonation have been proposed (refer to JP-A 2007-304801 (KOKAI); Japanese Paten No. 3822483; T. Mita, T. Kaneko, and O. Hori, Joint Haar-like features for face detection, In Proc. Tenth IEEE International Conference on Computer Vision (ICCV 2005), pp. 1619-1626, Beijing, China, October 2005; Takeshi Mita, Toshimitsu Kaneko, and Osamu Hori, Joint Haar-like features based on feature co-occurrence for face detection, Journal of the Institute of Electronics, Information and Communication Engineers, Vol. J89-D-II, No. 8, pp. 1791-1801, August 2006; M. Yuasa, T. Kozakaya, and O. Yamaguchi, An efficient 3d geometrical consistency criterion for detection of a set of facial feature points, In Proc. IAPR Conf. on Machine Vision Applications (MVA2007), pp. 25-28, Tokyo, Japan, May 2007; Mayumi Yuasa, Tomoyuki Takeguchi, Tatsuo Kozakaya, Osamu Yamaguchi, "Automatic facial feature point detection for face recognition from a single image", Technical Report of the Institute of Electronics, Information, and Communication Engineers, PRMU2006-222, pp. 5-10, February 2007; and Miki Yamada, Akiko Nakashima, and Kazuhiro Fukui, "Head pose estimation using the factorization and subspace method", Technical Report of the Institute of Electronics, Information, and Communication Engineers, PRMU2001-194, pp. 1-8, January 2002). According to one of these methods, impersonation using a photograph of a face is detected by using a moving image input to a passive (i.e., non-light-emitting) monocular imaging device to examine the three-dimensional shape of a human face. This method is advantageous in that the device for detecting impersonation does not have to be large-scaled and in being capable of widely applied. For example, in a technique disclosed in JP-A No. 2007-304801 (KOKAI), facial feature points in two images of a captured face with different face orientations are detected and it is determined whether the shape formed by the facial feature points is two-dimensional or three-dimensional.

In the technique of JP-A No. 2007-304801 (KOKAI), however, facial feature points having a large error in a detected position may also be determined to be three-dimensional, that is, an image of a captured face may be determined to be a human face rather than a photograph of the face.

DETAILED DESCRIPTION

Figure 1:
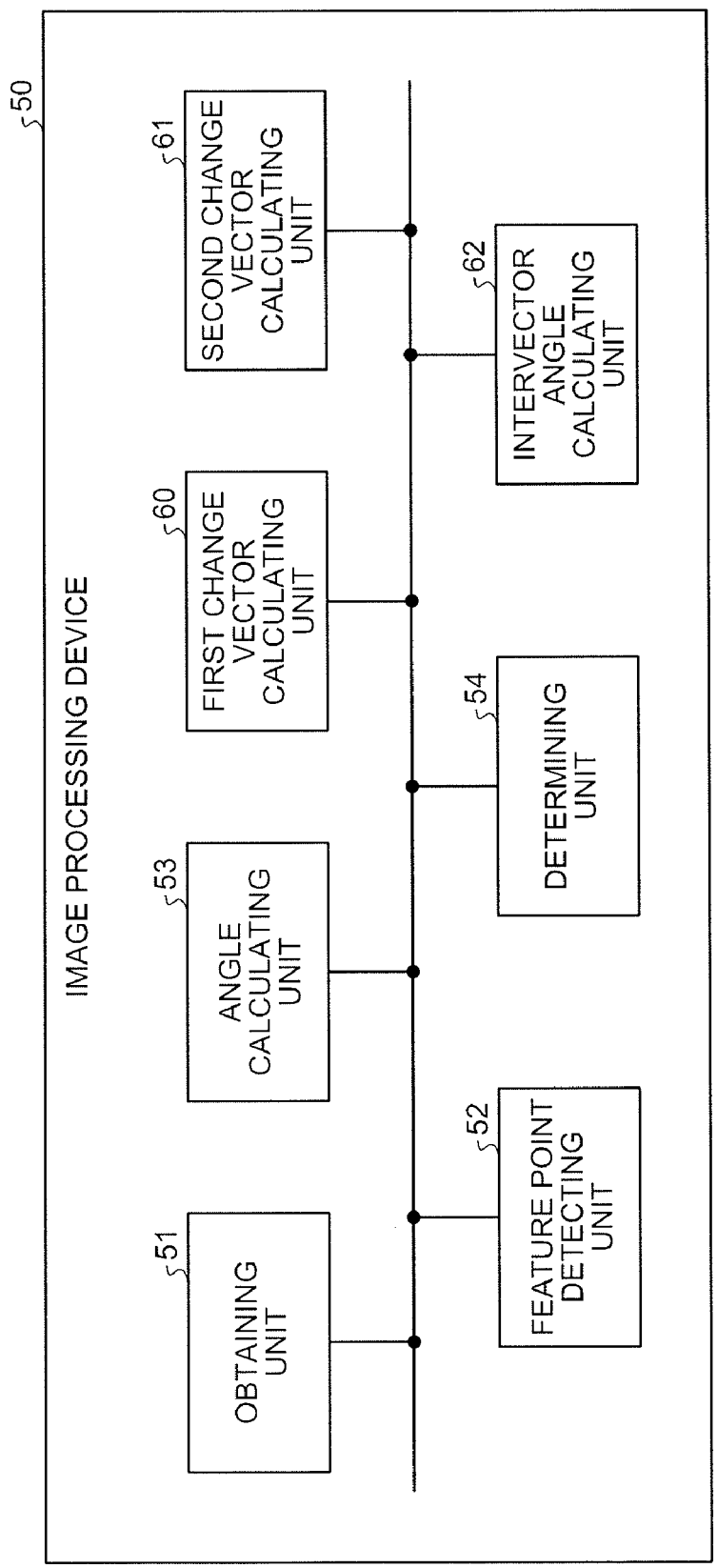
FIG. 1 is a diagram illustrating a configuration of an image processing device according to a first embodiment.

According to one embodiment, an image processing device includes an obtaining unit configured to obtain a plurality of images captured in time series; a first calculating unit configured to calculate a first change vector indicating a change between the images in an angle representing a posture of a subject included in each of the images; a second calculating unit configured to calculate a second change vector indicating a change in coordinates of a feature point of the subject; a third calculating unit configured to calculate an intervector angle between the first change vector and the second change vector; and a determining unit configured to determine that the subject is three-dimensional when the intervector angle is smaller than a predetermined first threshold.

Various embodiments will be described hereinafter with reference to the accompanying drawings.

First Embodiment

A first embodiment of an image processing device and method will be described below in detail with reference to the accompanying drawings. First, a hardware configuration of the image processing device will be described. The image processing device according to the first embodiment includes a control unit such as a central processing unit (CPU) configured to control the entire device, a main storage unit such as a read only memory (ROM) and a random access memory (RAM) configured to store therein various data and various programs, an auxiliary storage unit such as a hard disk drive (HDD) and a compact disk (CD) drive configured to store therein various data and various programs, and a bus that connects these units, which is a hardware configuration using a computer system. In addition, an image input unit constituted by a charge coupled device (CCD) image sensor and the like configured to capture a subject and input the captured image, an operation input unit such as a keyboard and a mouse configured to receive instructions input by the user, and a communication interface (I/F) configured to control communication with an external device are connected to the image processing device through wired or wireless connections.

Examples of the subject include a face, a human, an animal and an object. An image input through the image input unit is a digital image that can be processed by a computer system. The image can be expressed by f(x, y) where (x, y) represents plane coordinates and f represents a pixel value. In the case of a digital image, x, y and f are expressed as discrete values. (x, y) is a sample point arranged in an image and is called a pixel. For example, in the case of an image with a screen resolution of "640×480" pixels called VGA, x and y can be values of "x=0, . . . , 639, y=0, . . . , 479". Information to be obtained by performing image processing to obtain a position of a feature point of the image or a corresponding point thereof or performing edge extraction may be a pixel. In this case, a position of a "point" or an "edge" refers to a specific "pixel". However, if a feature point, a corresponding point or an edge is to be obtained more precisely, a position among pixels may be obtained as real values x and y by a method called sub-pixel estimation. In this case, a "point" refers to a position (x, y) expressed by real values x and y and does not necessarily represent one specific pixel. The pixel value (or gray level) f is an integer value from "0" to "255" in the case of an 8-bit monochrome image. In the case of a 24-bit color image, f is represented as a three-dimensional vector in which each of R, G and B is an integer value from "0" to "255".

A feature point in an image is a point used for locating a subject in the image. Typically, a plurality of feature points are set and used in one image. A feature point may be set by mechanically extracting a point where the pixel value changes drastically in space as the feature point from an image or may be set to a specific point in a small region where a change (texture) of a specific pixel value is assumed in advance. For example, in the former case, a point where a change in the pixel value is the maximum may be used, and in the later case, the center point of a pupil may be used if the subject is a human face. A feature point that is mechanically extracted is associated one-to-one with a feature point between a plurality of images, which allows detection of an obstacle, estimation of motion of an object, estimation of the number of objects, acquisition of a shape of an object or the like. Specifically, even a mechanically extracted feature point that has not been assumed can effectively be used by calculating or setting a feature point in another image with which the feature point is associated by means of template matching. When the feature point is set to a specific point in a specific subject that is a specific point in a small region where a change (texture) of a specific pixel value is assumed in advance, even just detecting the feature point in a single image is useful. For example, if feature points (such as the center of an eye, the tip of the nose and an end point of the mouth) in a human face as a subject can be detected from an unknown image that is newly provided, the detection is useful allowing information such as the presence, position, posture and expression of the human to be obtained through the detection alone.

If the subject is a human face, the eyes, the nose, the mouth and the like included within a region representing the face in an image may be called facial parts. For example, when a small region including the eyes in a face in an image is assumed, the region of the eyes including eyelids and pupils may be regarded as a part constituting the face and called a facial part. In contrast, the center point of a pupil, the outer corner of an eye, the inner corner of an eye, a left or right nostril, the midpoint of left and right nostrils, the tip of the nose and the like that are points used for locating and that are also feature points within the face region or in the vicinity thereof are referred to as facial feature points. Note that, also in the cases of subjects other than a face, parts that are constituent elements of the entire subject are referred to as parts and specific points within the parts that are used for locating are referred to as feature points.

Next, description will be made on various functions implemented by executing image processing programs stored in a storage device or the auxiliary storage unit by the CPU of the image processing device in the hardware configuration described above. FIG. 1 is a diagram illustrating a configuration of an image processing device 50. The image processing device 50 includes an obtaining unit 51, a feature point detecting unit 52, an angle calculating unit 53, a first change vector calculating unit 60, a second change vector calculating unit 61, an intervector angle calculating unit 62 and a determining unit 54. These units are implemented on the main storage unit such as a RAM when the CPU executes the image processing programs.

The obtaining unit 51 obtains images in units of frames captured in time series by the image input unit. The obtained images are stored in a storage unit that is not illustrated. In this embodiment, the obtaining unit 51 obtains the images together with frame numbers that can uniquely identify the images in units of frames and times at which the images are captured, for example. The feature point detecting unit 52 detects facial feature points from the images obtained by the obtaining unit 51. Specifically, the feature point detecting unit 52 detects a region (referred to as a face region) representing a face in the images obtained by the obtaining unit 51, detects facial feature points in the detected face region and outputs, as detection results, feature point information that is information such as presence or absence of a face in the images, coordinates representing the position of the face region and the size thereof, coordinates representing the positions of the facial feature points and a certainty factor of the detection results. Note that to identify a position in an image is expressed as "to detect". A known technique may be used for detection of the facial feature points. For example, the face region is detected by a method described in Joint Haar-like features for face detection, T. Mita, T. Kaneko, and O. Hori, In Proc. Tenth IEEE International Conference on Computer Vision (ICCV 2005), pp. 1619-1626, Beijing, China, October 2005; and Joint Haar-like features based on feature co-occurrence for face detection, Takeshi Mita, Toshimitsu Kaneko, and Osamu Hori, Journal of the Institute of Electronics, Information and Communication Engineers, Vol. J89-D-II, No. 8, pp. 1791-1801, August 2006. For example, the facial feature points are detected using the information on the detected face region by a method described in An efficient 3d geometrical consistency criterion for detection of a set of facial feature points, M. Yuasa, T. Kozakaya, and O. Yamaguchi, In Proc. IAPR Conf. on Machine Vision Applications (MVA2007), pp. 25-28, Tokyo, Japan, May 2007; and "Automatic facial feature point detection for face recognition from a single image", Mayumi Yuasa, Tomoyuki Takeguchi, Tatsuo Kozakaya, Osamu Yamaguchi, Technical Report of the Institute of Electronics, Information, and Communication Engineers, PRMU2006-222, pp. 5-10, February 2007. Coordinates in an image captured by the image input unit are referred to as image coordinates. The image coordinates represent a position of the face region and a position of a facial feature point.

The angle calculating unit 53 calculates an angle (referred to as a face orientation angle) representing the orientation (posture) of a human face using the coordinates of the facial feature points included in the feature point information output from the feature point detecting unit 52. A known technique may be used for calculation of the face orientation angle. For example, the face orientation angle is calculated from the coordinates of the facial feature points by using a method described in Joint Haar-like features for face detection, described above; and "Head pose estimation using the factorization and subspace method", Miki Yamada, Akiko Nakashima, and Kazuhiro Fukui, Technical Report of the Institute of Electronics, Information, and Communication Engineers, PRMU2001-194, pp. 1-8, January 2002.

The first change vector calculating unit 60 calculates a change vector representing a temporal change of the face orientation angle using the face orientation angle calculated by the angle calculating unit 53. The second change vector calculating unit 61 calculates a change vector representing a temporal change of the coordinates of the facial feature points using the coordinates of the facial feature points included in the feature point information output by the feature point detecting unit 52. The intervector angle calculating unit 62 calculates an intervector angle between the change vector calculated by the first change vector calculating unit 60 and the change vector calculated by the second change vector calculating unit 61. The determining unit 54 determines that what is captured in the images obtained by the obtaining unit 51 is a three-dimensional human face rather than a photograph if the intervector angle calculated by the intervector angle calculating unit 62 is smaller than a predetermined first threshold, and outputs the determination result. The determination result is used in a face recognition application for recognizing whose face a face on an image is or other face image processing applications for processing a face image, for example.

As described above, the image processing device 50 analyzes the three-dimensional shape of a human face included in images captured by the image input unit, and determines whether or not what is captured in the images is a three-dimensional human face rather than a photograph to perform determination on impersonation.

An outline of a method for calculating a face orientation angle by the angle calculating unit 53 will be described here. A pseudo inverse matrix $A^+$ of a matrix A of n rows and m columns is defined by an equation (1). The pseudo inverse matrix is calculated by the upper equation when "$n \leq m$" is satisfied, and by the lower equation when "$n \leq m$" is satisfied. When A is a square matrix, the pseudo inverse matrix thereof is equal to an inverse matrix thereof.

$$A^+ = \begin{cases} (A^T A)^{-1} A^T & (n \leq m) \\ A^T (A A^T)^{-1} & (n \geq m) \end{cases} \quad (1)$$

Coordinates of n points in a three-dimensional Euclidean space are represented by a matrix X as in an equation (2), and a rotation matrix R is represented by an equation (3). The superscript T in the equation (3) represents a transpose. The rows of R are represented by a vector $R_i$ as in an equation (4). When a face orientation angle in an image at the f-th frame is represented by a rotation matrix $R_f$, coordinates of n facial feature points in the image at the f-th frame are represented by $X_f$, and coordinates of feature points in the 0-th frame that is a reference are represented by $X_0$, the relationship in an equation (5) is satisfied. Furthermore, when the coordinates $X_f$ of the feature points in the image at the f-th frame are obtained, the rotation matrix $R_f$ can be obtained by an equation (6) using the pseudo inverse matrix of $X_f$, that is, by multiplication of the matrices. The calculation by the equation (6) corresponds to a solution of simultaneous linear equations by the method of least squares when n is equal to or larger than "4".

Since the coordinates of the feature points that can be obtained directly from the image are coordinates in a two-dimensional image, equations that can be applied in this case can be described in a manner similar to the equations (2) to (6). When coordinates of n points in two dimensions are represented by a matrix X' as in an equation (7) and the upper two rows of the rotation matrix are represented by R' defined by an equation (8), a rotation matrix $R'_f$ in the image at the f-th frame can be represented by an equation (9) using two-dimensional coordinates $X'_f$ of the n feature points at the f-th frame and the two-dimensional coordinates $X_0$ of the feature points at the 0-th frame that is a reference.

$$X = \begin{bmatrix} X_1 & \dots & X_n \\ Y_1 & \dots & Y_n \\ Z_1 & \dots & Z_n \end{bmatrix}, \quad (2)$$

$$R = \begin{bmatrix} R_{11} & R_{12} & R_{13} \\ R_{21} & R_{22} & R_{23} \\ R_{31} & R_{32} & R_{33} \end{bmatrix} = \begin{bmatrix} R_1^T \\ R_2^T \\ R_3^T \end{bmatrix}, \quad (3)$$

$$R_i = \begin{bmatrix} R_{i1} \\ R_{i2} \\ R_{i3} \end{bmatrix}, \quad (4)$$

$$X_f = R_f X_0, \quad (5)$$

$$R_f = X_f X_0^+, \quad (6)$$

$$X' = \begin{bmatrix} X_1 & \dots & X_n \\ Y_1 & \dots & Y_n \end{bmatrix}, \quad (7)$$

$$R' = \begin{bmatrix} R_{11} & R_{12} & R_{13} \\ R_{21} & R_{22} & R_{23} \end{bmatrix} = \begin{bmatrix} R_1^T \\ R_2^T \end{bmatrix}, \quad (8)$$

$$R'_f = X'_f X_0^+ \quad (9)$$

In order to obtain the face orientation angle from the rotation matrix $R'_f$ of a 2×3 matrix calculated from coordinates of feature points containing errors, it is necessary to derive a complete form of a 3×3 rotation matrix, derive three-dimensional angle vectors therefrom, exclude components in the image plane and obtain a two-dimensional face orientation angle.

The rotation matrix $R'_f$ of the 2×3 matrix is constituted by a row vector $R_1$ and a row vector $R_2$. First, the row vectors are normalized by an equation (10) so that the norms thereof become "1" to obtain a row vector $R'_1$ and a row vector $R'_2$, respectively. Next, the directions of the vectors are modified by equations (11) and (12) so that the two row vectors become perpendicular to each other to obtain a row vector $R''_1$ and a row vector $R''_2$, respectively. The two obtained vectors satisfy an equation (13). At this point, the upper two rows of the complete form of the rotation matrix are obtained.

$$R'_1 = \frac{R_1}{|R_1|}, \quad R'_2 = \frac{R_2}{|R_2|}, \tag{10}$$

$$R''_1 = \frac{1}{\sqrt{2}} \left( \frac{R'_1 + R'_2}{|R'_1 + R'_2|} + \frac{R'_1 - R'_2}{|R'_1 - R'_2|} \right), \tag{11}$$

$$R''_2 = \frac{1}{\sqrt{2}} \left( \frac{R'_1 + R'_2}{|R'_1 + R'_2|} + \frac{R'_2 - R'_1}{|R'_2 - R'_1|} \right), \tag{12}$$

$$|R''_1| = |R''_2| = 1, \quad R''_1 \cdot R''_2 = 0 \tag{13}$$

In order to obtain the remaining lowermost row, calculation using quaternions $\lambda_0, \lambda_1, \lambda_2$ and $\lambda_3$ as parameters is performed. The rotation matrix R is represented by an equation (14) by using the quaternions. If upper-left four components ($R_{11}, R_{12}, R_{21}$ and $R_{22}$) are used out of the components of the rotation matrix R, the quaternions can be calculated by using equations (15) to (22), but uncertainty remains in the signs of $\lambda_1$ and $\lambda_2$. Finally, the uncertainty in the signs is resolved and the quaternions are uniquely obtained by adopting the signs at which the sign of $R_{13}$ and the sign of $2(\lambda_1\lambda_3 + \lambda_0\lambda_2)$ on the first row and the third column in the equation (14) match each other. The complete form of the 3×3 rotation matrix is obtained by using the obtained quaternions and the equation (14). The complete form of the 3×3 rotation matrix represents a three-dimensional rotational motion.

$$R = \begin{bmatrix} \lambda_0^2 + \lambda_1^2 - \lambda_2^2 - \lambda_3^2 & 2(\lambda_1\lambda_2 - \lambda_0\lambda_3) & 2(\lambda_1\lambda_3 + \lambda_0\lambda_2) \\ 2(\lambda_1\lambda_2 + \lambda_0\lambda_3) & \lambda_0^2 - \lambda_1^2 + \lambda_2^2 - \lambda_3^2 & 2(\lambda_2\lambda_3 - \lambda_0\lambda_1) \\ 2(\lambda_1\lambda_3 - \lambda_0\lambda_2) & 2(\lambda_2\lambda_3 + \lambda_0\lambda_1) & \lambda_0^2 - \lambda_1^2 - \lambda_2^2 + \lambda_3^2 \end{bmatrix} \tag{14}$$

$$a = R_{11} + R_{22}, \tag{15}$$

$$b = R_{11} - R_{22}, \tag{16}$$

$$c = R_{12} + R_{21}, \tag{17}$$

$$d = R_{12} - R_{21}, \tag{18}$$

$$\lambda_0 = \frac{1}{2}\sqrt{a + \sqrt{a^2 + d^2}}, \tag{19}$$

$$\lambda_3 = \frac{d}{4\lambda_0}, \tag{20}$$

$$\lambda_1 = \pm\frac{1}{2}\sqrt{b + \sqrt{b^2 + c^2}}, \tag{21}$$

$$\lambda_2 = \frac{c}{4\lambda_1}, \tag{22}$$

A rotation matrix can be expressed by a roll $\phi$, a pitch $\theta$ and a yaw $\psi$ that are three-dimensional angle vectors. The relation thereof is expressed by an equation (23) and ranges of the respective angles are expressed by expressions (24) without loss of generality. $\theta$ is calculated by an equation (25), and $\phi$ is calculated by equations (26) to (28). In the case of the C language that is a programming language, $\phi$ is calculated by an equation (29) using the atan2 function. Specifically, this is a mechanism for obtaining information on the signs of cos $\phi$ and sin $\phi$ because $\phi$ in the equation (28) can be two values within the range of $\phi$ represented by the equation (24) if it is attempted to be obtained by the arctan function. The same applies to $\psi$, which is obtained by employing the atan2 function in an equation (30) as in an equation (31).

$$R = \begin{bmatrix} \cos\phi\cos\theta & \cos\phi\sin\theta\sin\psi - \sin\phi\cos\psi & \cos\phi\sin\theta\cos\psi + \sin\phi\sin\psi \\ \sin\phi\cos\theta & \sin\phi\sin\theta\sin\psi + \cos\phi\cos\psi & \sin\phi\sin\theta\cos\psi - \cos\phi\sin\psi \\ -\sin\theta & \cos\theta\sin\psi & \cos\theta\cos\psi \end{bmatrix} \tag{23}$$

$$\begin{cases} -\pi \leq \phi < \pi \\ -\frac{\pi}{2} \leq \theta \leq \frac{\pi}{2} \\ -\pi \leq \psi < \pi \end{cases} \tag{24}$$

$$\theta(\text{pitch}) = \arctan\left(\frac{-R_{31}}{\sqrt{R_{11}^2 + R_{21}^2}}\right), \tag{25}$$

$$\cos\phi = \frac{R_{11}}{\cos\theta} = \frac{R_{11}}{\sqrt{R_{11}^2 + R_{21}^2}}, \tag{26}$$

$$\sin\phi = \frac{R_{21}}{\cos\theta} = \frac{R_{21}}{\sqrt{R_{11}^2 + R_{21}^2}}, \tag{27}$$

$$\tan\phi = \frac{R_{21}}{R_{11}}, \tag{28}$$

$$\phi(\text{roll}) = a\tan2(R_{21}, R_{11})(-\pi \leq \phi \leq \pi), \tag{29}$$

$$\tan\psi = \frac{R_{32}}{R_{33}}, \tag{30}$$

$$\psi(\text{yaw}) = a\tan2(R_{32}, R_{33})(-\pi \leq \psi \leq \pi) \tag{31}$$

Equations (32) to (34) are used to convert a rotation matrix $R_{Cf}$ in camera coordinates to a rotation matrix $R_{Hf}$ in coordinates representing a face orientation angle. The camera coordinates will be briefly described based on Chapter 2 of "Three-dimensional Vision" by Gang Xu and Saburo Tsuji (Kyoritsu Shuppan, 1998). "Camera coordinates" are three-dimensional coordinates in which a Z-axis represents an optical axis of a camera, and the remaining two axes, namely, an X-axis and a Y-axis are set to be perpendicular to the Z-axis. If parallel projection that is the most simple camera model is employed, the following relationship is satisfied between the camera coordinates $[X, Y, Z]^T$ and image coordinates $[x, y]^T$ of a two-dimensional image on the image plane thereof: $[X, Y]^T = [x, y]^T$. T represents a transpose herein.

$$R(Z, \phi) = \begin{bmatrix} \cos\phi & -\sin\phi & 0 \\ \sin\phi & \cos\phi & 0 \\ 0 & 0 & 1 \end{bmatrix}, \tag{32}$$

$$R_{CH} = R(Z, -\pi/2), \tag{33}$$

$$R_{Hf} = R_{CH}^{-1} R_{Cf}^{-1} R_{CH} \tag{34}$$

Figure 2A:
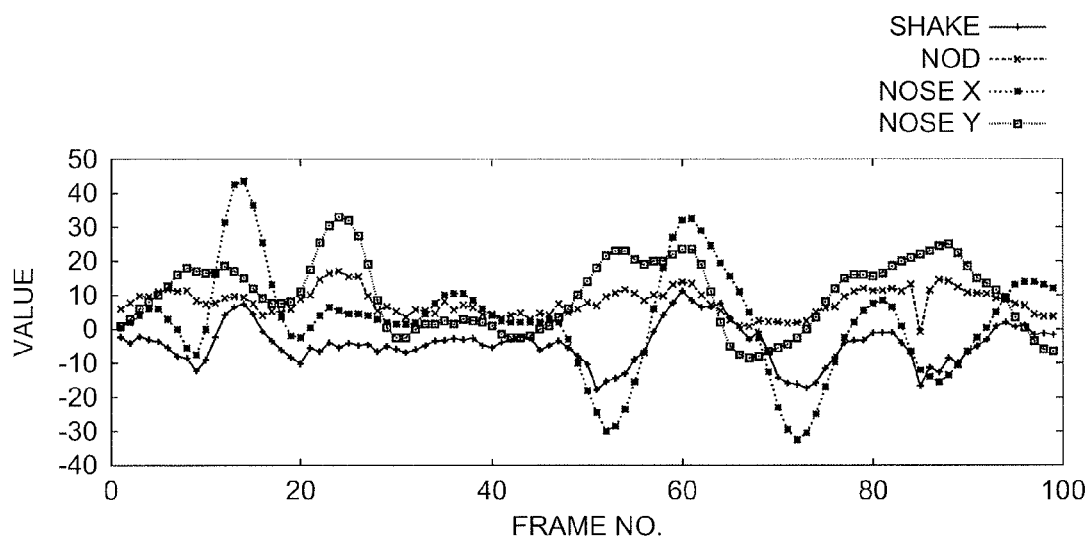
FIG. 2A illustrates a graph plotting a face orientation angle and coordinates of the midpoint of nostrils of a human face.
Figure 2B:
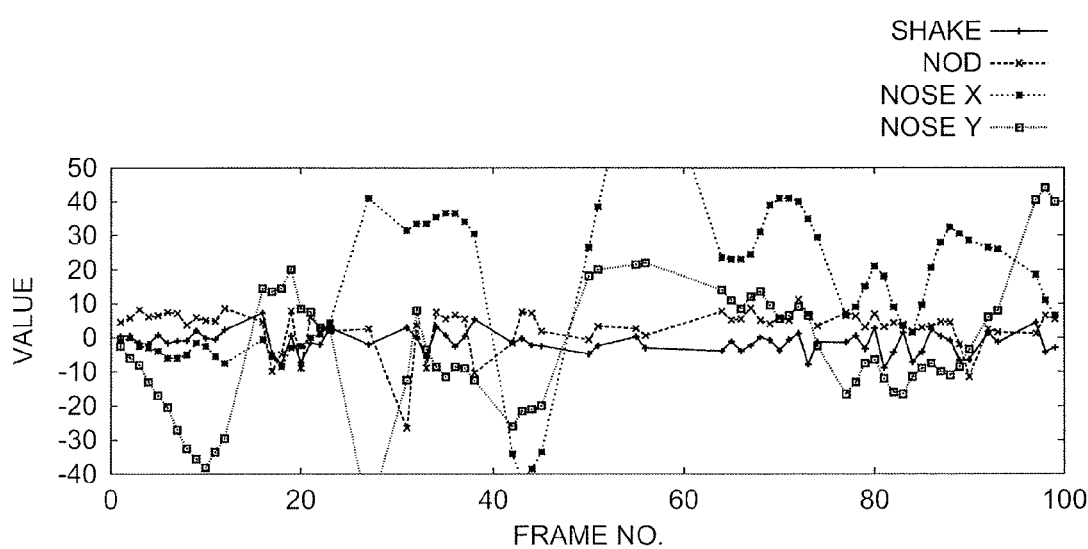
FIG. 2B illustrates a graph plotting a face orientation angle and coordinates of the midpoint of nostrils of a face in a photograph.

Next, an outline of the principle of determination on impersonation in this embodiment will be described. FIGS. 2A and 2B illustrate graphs each plotting a face orientation angle and coordinates of the midpoint of nostrils that is a facial feature point in time series. FIG. 2A plots a face orientation angle and coordinates of the midpoint of nostrils in a case where a human is captured. The horizontal axis represents frame numbers, which are arranged in order of time at which images are captured. The vertical axis represents values of the coordinates. A face orientation angle in the horizontal direction is represented by a solid line and a "+" mark (positive in rightward direction), a face orientation angle in the vertical direction is represented by a broken line and a "x" mark (positive in upward direction), an x-coordinate at the position of the midpoint of two nostrils is represented by a dotted line and a "*" mark, and a y-coordinate at the position is represented by a finer dotted line and a "□" mark. It can be seen that movements of the face orientation angle in the horizontal direction (solid line) and the x-coordinate of the position of the midpoint of nostrils (dotted line) are correlated with each other, and that movements of the face orientation angle in the vertical direction (broken line) and the y-coordinate of the midpoint of nostril positions (finer dotted line) are correlated with each other. The four curves change continuously and substantially smoothly. FIG. 2B, on the other hand, plots a face orientation angle and coordinates of the midpoint of nostrils of a face in a photograph. The types of lines used therein are the same as those in FIG. 2A. It can be seen in FIG. 2B that the four curves are not particularly correlated with one another and the movements thereof are not continuous, and that the face orientation angles change substantially randomly.

Figure 3A:
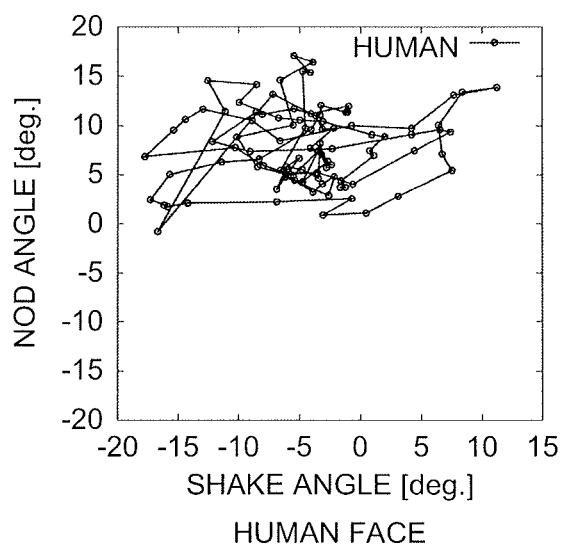
FIG. 3A illustrates a graph plotting an example of a trajectory of a face orientation angle in images in which a human face is captured.
Figure 3B:
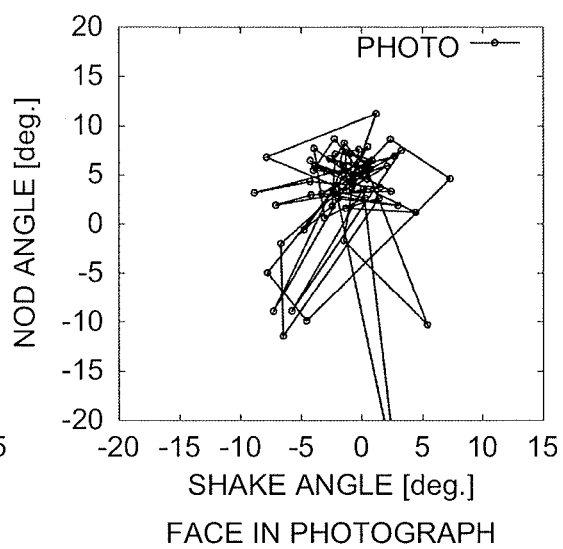
FIG. 3B illustrates a graph plotting an example of a trajectory of a face orientation angle in images in which a photograph containing a face is captured.

FIGS. 3A and 3B illustrate graphs plotting examples of a trajectory of a face orientation angle in images in which a human face is captured, and images in which a photograph containing a face is captured. FIG. 3A illustrates an example in which a human face is captured, and FIG. 3B illustrates an example in which a photograph containing a face is captured. As illustrated in FIG. 3A, the face orientation angle of the human face changes smoothly, and the trajectory of the face orientation angle falls within a certain region. As illustrated in FIG. 3B, on the other hand, the trajectory of the face orientation angle of the face on the photograph is similar to that of a white noise around the vicinity of the origin.

Next, procedures of an impersonation detection process performed by the image processing device 50 according to the first embodiment will be described referring to FIG. 4. In step S1, the obtaining unit 51 of the image processing device 50 obtains images captured by the image input unit. In step S2, the feature point detecting unit 52 detects facial feature points from the images obtained in step S1. If no feature point is detected in step S2 (No in step S3), the process returns to step S1. If facial feature points are detected in step S2 (Yes in step S3), the feature point detecting unit 52 outputs feature point information that is information of coordinates representing the position of a face region and the size thereof, and coordinates representing the positions of the facial feature points. In step S4, the angle calculating unit 53 calculates a two-dimensional face orientation angle by the equations (7) to (34) using the coordinates of the facial feature points included in the feature point information.

Figure 5:
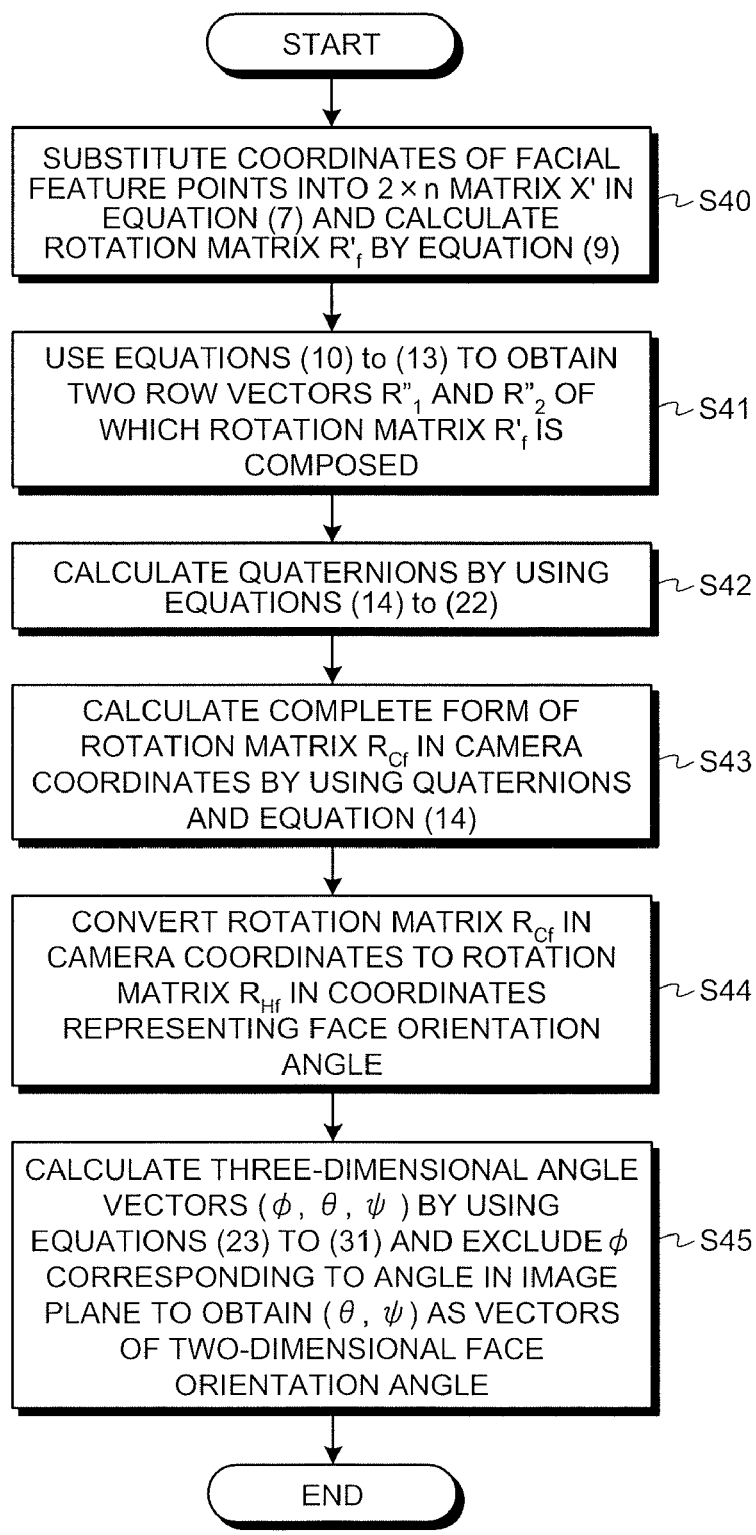
FIG. 5 is a flowchart illustrating procedures for calculating the face orientation angle.

The procedure in step S4 will be described in further detail here referring to FIG. 5. Note that the image processing device 50 sets standard three-dimensional coordinates $X_0$ that are coordinates of facial feature points in a reference posture in which the face orientation angle is "0", calculates a pseudo inverse matrix $X_0^+$ thereof, and stores the calculated pseudo inverse matrix in the main storage unit, for example, in advance. In step S40, the angle calculating unit 53 substitutes the coordinates of the facial feature points detected in step S2 into the 2×n matrix X' in the equation (7) and calculate the rotation matrix $R'_f$ by the equation (9). In step S41, the angle calculating unit 53 uses the equations (10) to (13) to obtain two row vectors $R''_1$ and $R''_2$ of which the rotation matrix $R'_f$ is composed. In step S42, the angle calculating unit 53 calculates the quaternions by using the equations (14) to (22). The uncertainty in the signs is determined and resolved using the sign of $R_{13}$. In step S43, the angle calculating unit 53 calculates the complete form of the rotation matrix in camera coordinates by using the quaternions calculated in step S42 and the equation (14). The obtained rotation matrix is referred to as the rotation matrix $R_{Cf}$. In step S44, the angle calculating unit 53 converts the rotation matrix $R_{Cf}$ in camera coordinates to the rotation matrix $R_{Hf}$ in coordinates representing the face orientation angle by using the equations (32) to (34). In step S45, the angle calculating unit 53 calculates the three-dimensional angle vectors $(\phi, \theta, \psi)$ by using the equations (23) to (31), and excludes $\phi$ corresponding to an angle in the image plane to obtain $(\theta, \psi)$ as vectors of a two-dimensional face orientation angle. As described above, the angle calculating unit 53 calculates the face orientation angle in step S4.

Figure 4:
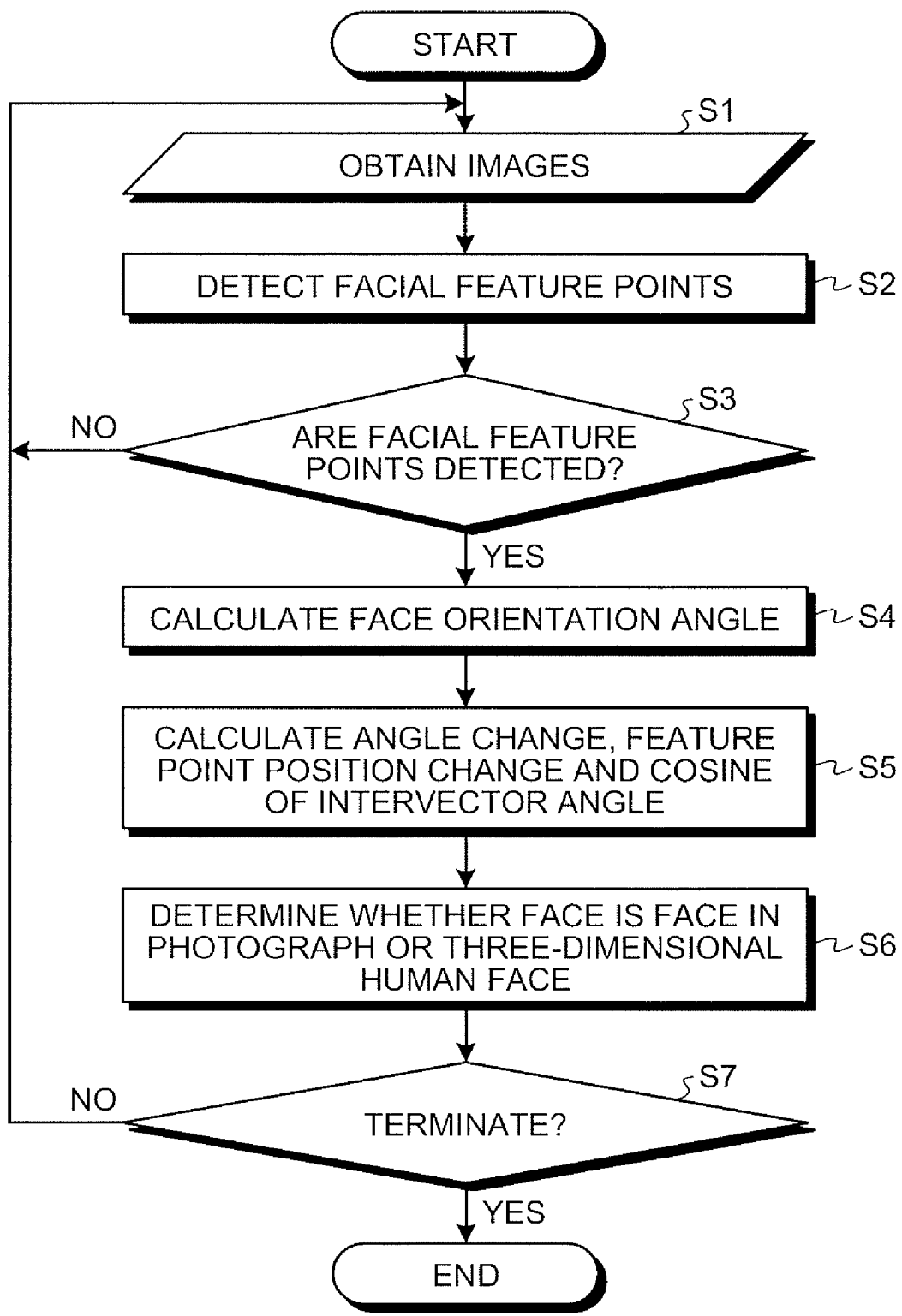
FIG. 4 is a flowchart illustrating procedures of an impersonation detection process.

The description refers back to FIG. 4. In step S5, the first change vector calculating unit 60 calculates a change vector representing a temporal change of the face orientation angle using the face orientation angle calculated in step S4. The second change vector calculating unit 61 calculates a change vector representing a temporal change of the coordinates of the facial feature points using the coordinates of the facial feature points detected in step S3. The intervector angle calculating unit 62 calculates an intervector angle between the change vector calculated by the first change vector calculating unit 60 and the change vector calculated by the second change vector calculating unit 61. In step S6, the determining unit 54 determines whether or not the intervector angle calculated in step S5 is smaller than a predetermined first threshold, and if the intervector angle is smaller than the first threshold, the determining unit 54 determines that what is captured in the images obtained in step S1 is a three-dimensional human face rather than a photograph, and outputs the determination result. In step S7, the determining unit 54 determines whether or not the impersonation detection process is to be terminated, and terminates the process if it is determined to be terminated, or returns to step S1 if it is determined not to be terminated.

As described above, the determination on impersonation is performed by analyzing the three-dimensional shape of a human face included in images captured by the image input unit, and determining whether or not what is captured in the images is a three-dimensional human face rather than a photograph. Since the face orientation angle is calculated using coordinates of a plurality of feature points, it is less affected by an error of one specific feature point. In addition, there is a feature point such as a position of a nostril that is likely to be detected stably among several feature points. Accordingly, it is possible to calculate a first change vector from the face orientation angle that is less affected by the error, and to calculate a second change vector by using a feature point such as a position of a nostril that is stably detected. It can therefore be said that the technique of the first embodiment is less affected by a noise at one certain feature point and provides stable operations. Moreover, since coordinates of feature points obtained for a face recognition process can be utilized for determination, the impersonation determination can be performed at higher speed than a method of additionally processing image data for impersonation determination. In other words, with such a configuration, determination on impersonation can be performed robustly to a noise of feature points detected for analyzing the three-dimensional shape of a human face at high speed.

Second Embodiment

Next, a second embodiment of an image processing device and method will be described. Parts that are the same as those in the first embodiment described above will be described using the same reference numerals or description thereof will not be repeated.

Figure 6:
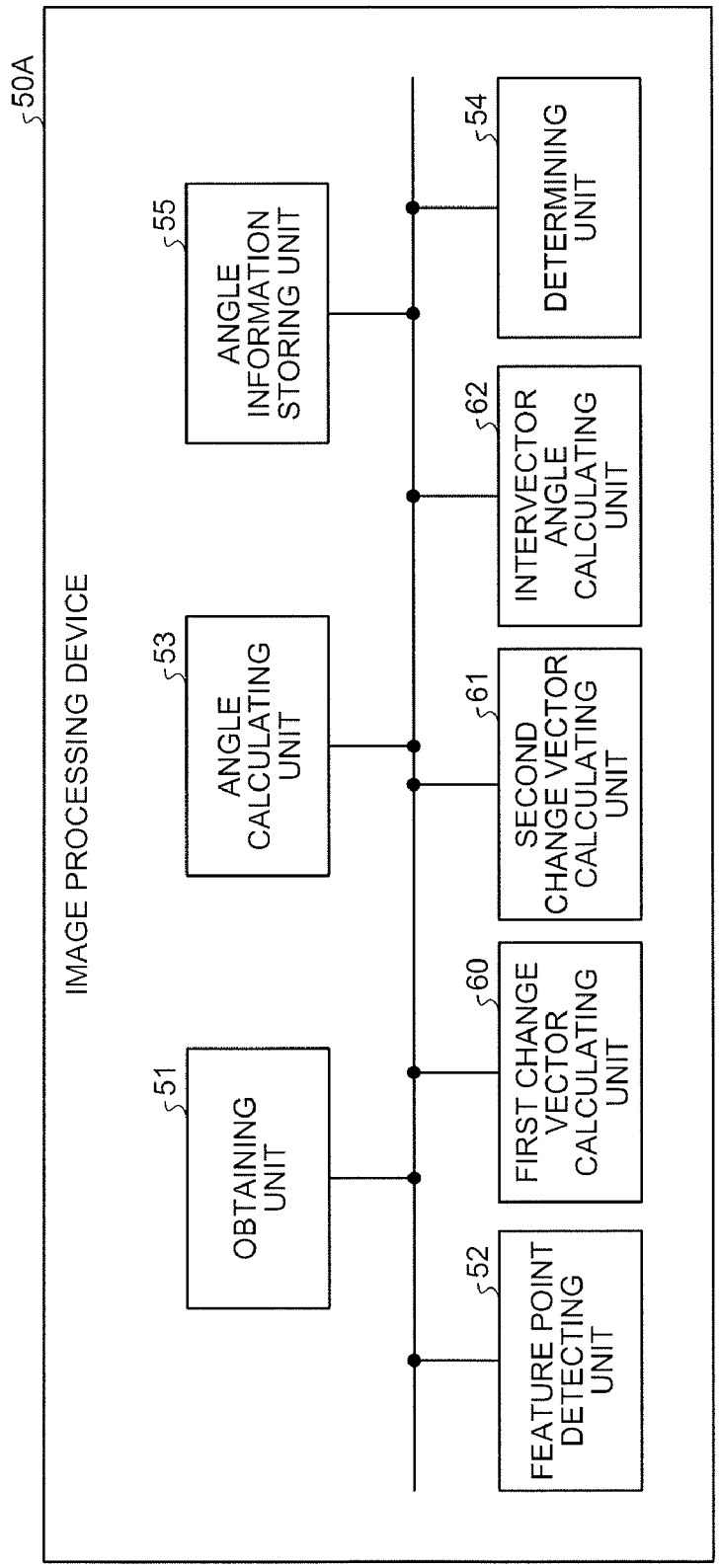
FIG. 6 is a diagram illustrating a configuration of an image processing device according to a second embodiment.

FIG. 6 is a diagram illustrating a configuration of an image processing device 50A according to the second embodiment. In the second embodiment, the image processing device 50A includes an angle information storing unit 55 in addition to the obtaining unit 51, the feature point detecting unit 52, the angle calculating unit 53, the first change vector calculating unit 60, the second change vector calculating unit 61, the intervector angle calculating unit 62 and the determining unit 54.

The angle information storing unit 55 stores therein face orientation angles that are calculated by the angle calculating unit 53 for respective frames in time series in association with frame numbers. The angle information storing unit 55 also stores therein, for each frame to be processed (processing target frame), a frame number of a frame (referred to as a relevant previous frame) that is a previous processing target frame referred to by the determining unit 54 as will be described later and fulfills a search condition described later and a frame number of a frame (referred to as an intermediate frame) that is a frame between the processing target frame and the relevant previous frame on time series and fulfills an identifying condition described later. The determining unit 54 refers to the face orientation angles stored for respective frames in the angle information storing unit 55, searches for the relevant previous frame and identifies the intermediate frame.

Next, procedures of an impersonation detection process performed by the image processing device 50A according to the second embodiment will be described referring to FIG. 7. Steps S1 to S4 are the same as those in the first embodiment described above. Note that in step S4, after calculating the face orientation angle for the processing target frame, the angle calculating unit 53 stores the face orientation angle in association with a frame number in time series in the angle information storing unit 55. In step S10, the determining unit 54 refers to the face orientation angles stored in association with the frame numbers in the angle information storing unit 55 to search for a relevant previous frame according to the following search condition. The search condition is that the face orientation angle calculated in a frame is different from the face orientation angle in the processing target frame by $\Delta\theta$ or more. If there is no such relevant previous frame, the process returns to step S1. If there is a relevant previous frame, the determining unit 54 refers to the face orientation angles stored in association with the frame numbers in the angle information storing unit 55 and identifies an intermediate frame according to the following identifying condition in step S11. The identifying condition is a frame in which the calculated face orientation angle is closest to the angle intermediate between the face orientation angle in the processing target frame and that in the previous frame that fulfills the condition (relevant previous frame) among the frames between the processing target frame and the relevant previous frame on time series. In this manner, the determining unit 54 searches for the relevant previous frame and identifies the intermediate frame for the present processing target frame, and stores the frame numbers thereof in the angle information storing unit 55.

Figure 8:
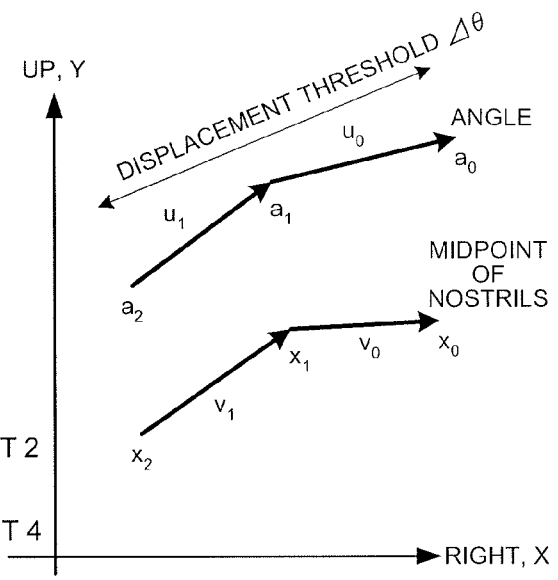
FIG. 8 is a graph conceptually illustrating a displacement of a face orientation angle and a displacement of coordinates of the midpoint of nostrils.

FIG. 8 is a graph conceptually illustrating displacements of a face orientation angle and displacements of coordinates of the midpoint of nostrils. Assuming that a facial feature point is the midpoint of nostrils, the face orientation angle in the processing target frame is $a_0$, and coordinates of the midpoint of nostrils are $x_0$, the face orientation angle in the relevant previous frame that is previous to the present processing target frame with a difference in the face orientation angle of $\Delta\theta$ or more is $a_2$, and the coordinates of the midpoint of nostrils in the relevant previous frame is $x_2$. The face orientation angle in a frame in which the calculated face orientation angle is closest to the intermediate angle between the face orientation angle in the processing target frame and that in the relevant previous frame is $a_1$, and the coordinates of the midpoint of nostrils in the frame is $x_1$.

Figure 7:
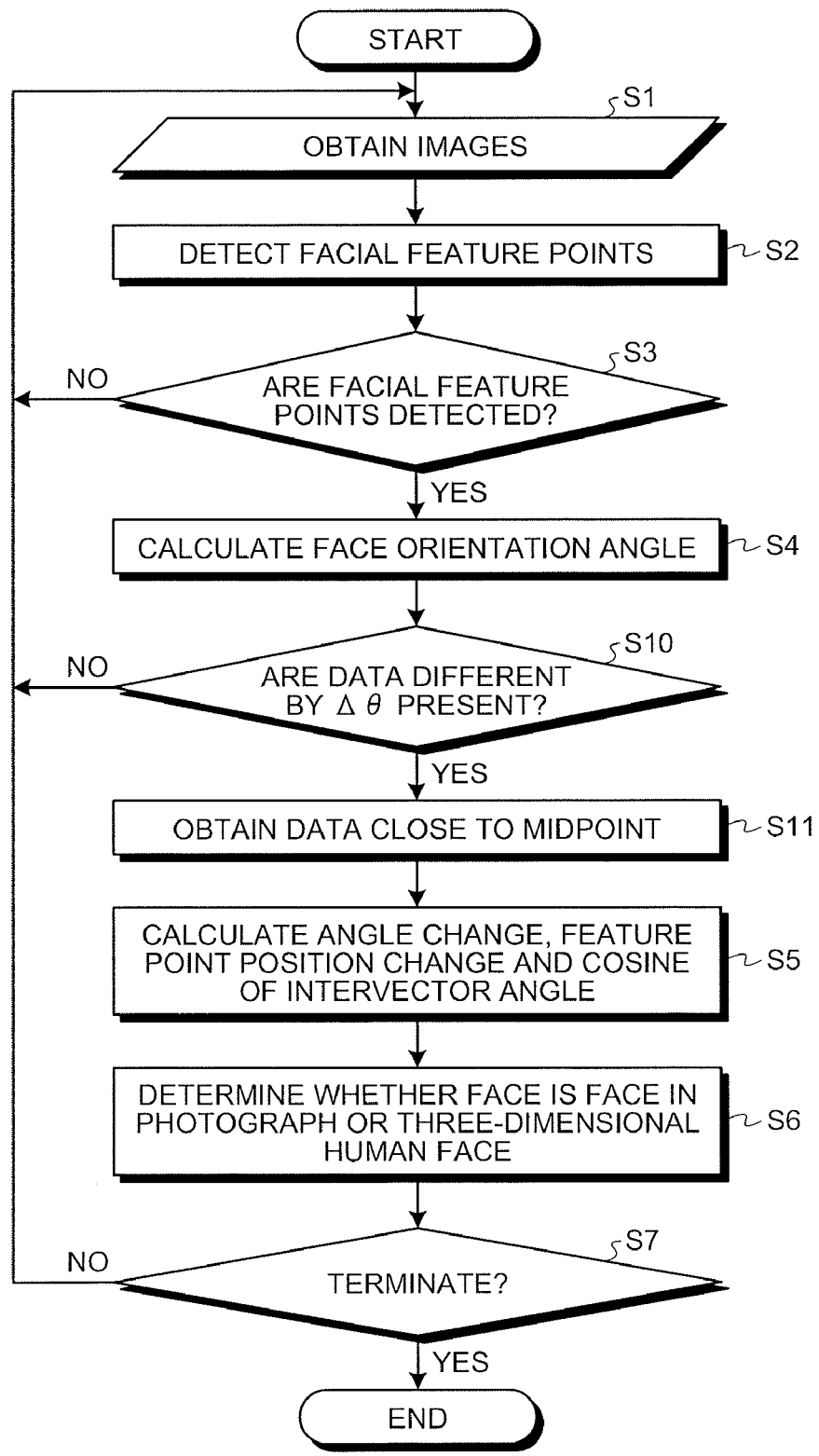
FIG. 7 is a flowchart illustrating procedures of an impersonation detection process.

The description refers back to FIG. 7. In step S5, the first change vector calculating unit 60 calculates a change vector representing a temporal change of the face orientation angle using the face orientation angle at the facial feature point calculated in step S11. The second change vector calculating unit 61 calculates a change vector representing a temporal change of the coordinates of the facial feature point using the facial feature point detected in step S11. The intervector angle calculating unit 62 calculates an intervector angle between the change vector calculated by the first change vector calculating unit 60 and the change vector calculated by the second change vector calculating unit 61. Procedures subsequent to step S5 are the same as those in the first embodiment described above.

With such a configuration, determination on impersonation can be performed more robustly to a noise of feature points detected for analyzing the three-dimensional shape of a human face at higher speed.

Figure 9:
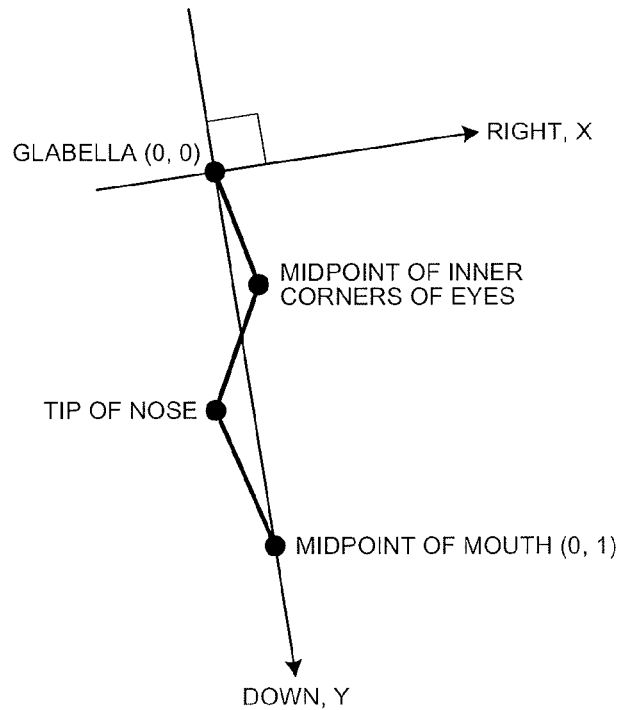
FIG. 9 illustrates four facial feature points.
Figure 10:
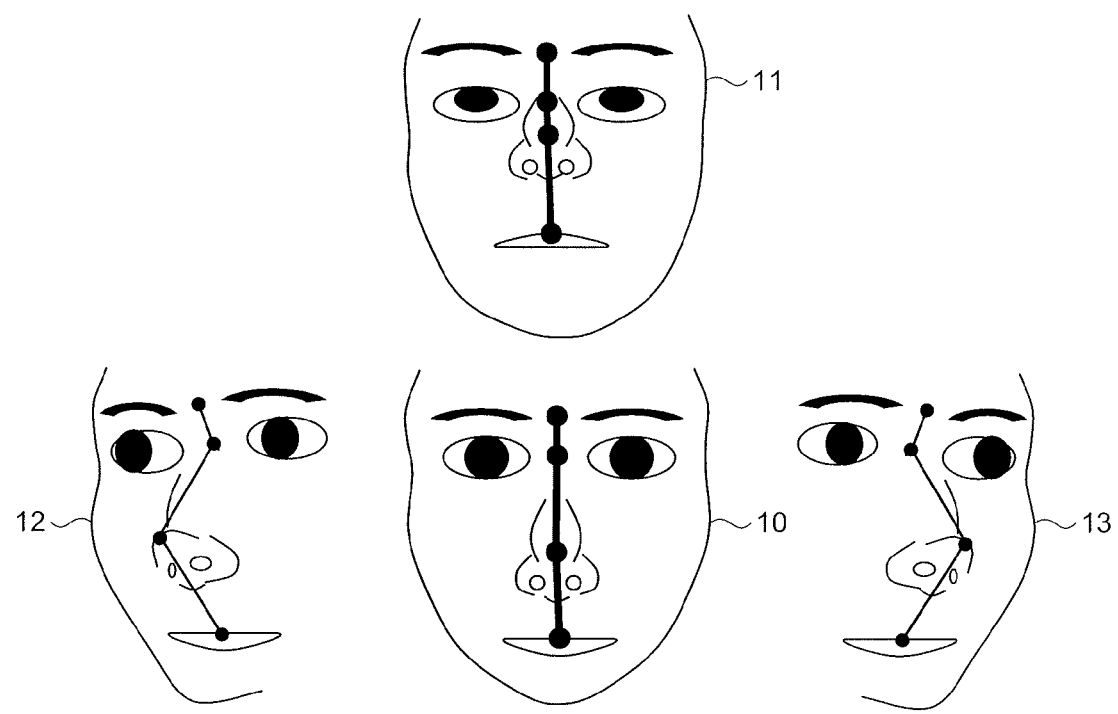
FIG. 10 illustrates views for explaining relations between images of a face at different face orientation angles and coordinates of facial feature points on the face center line.

Although coordinates in image coordinates are used as coordinates of facial feature points in the first and second embodiments described above, relative coordinates obtained by transforming image coordinates to other coordinates may be used. For example, if four facial feature points of the glabella, the midpoint of inner corners of the eyes, the tip of the nose, the midpoint of the mouth on the face center line as illustrated in FIG. 9 are used, it is possible to efficiently obtain the relative movements of positions of the four feature points by performing coordinate transformation by parallel translation, rotation and expansion (four degrees of freedom in total) so that coordinates of the glabella is (0, 0) and coordinates of the midpoint of the mouth is (0, 1), and obtaining relative coordinates of the midpoint of the inner corners of the eyes and the tip of the nose resulting from the transformation. FIG. 10 illustrates views for explaining relations between images of a face at different face orientation angles and coordinates of facial feature points on the face center line. The reference numeral 11 in FIG. 10 represents the facial feature points in an up-turned face image, the reference numeral 12 represents the facial feature points in a left-turned face image, and the reference numeral 13 represents the facial feature points in a right-turned face image. FIG. 10 shows that if the images are obtained by capturing an actual human face rather than a photograph by an imaging device, the relative coordinates of the four feature points of the glabella, the midpoint of the inner corners of the eyes, the tip of the nose and the midpoint of the mouth change in synchronization with the change in the face orientation angle. Thus, by utilizing such characteristics, it is possible to determine whether or not what is captured in the images by the image input unit is a three-dimensional human face rather than a photograph if the changes in the relative coordinates of the facial feature points are large among a plurality of images with different face orientation angles.

Third Embodiment

Next, a third embodiment of an image processing device and method will be described. Parts that are the same as those in the first embodiment or the second embodiment described above will be described using the same reference numerals or description thereof will not be repeated.

Figure 11:
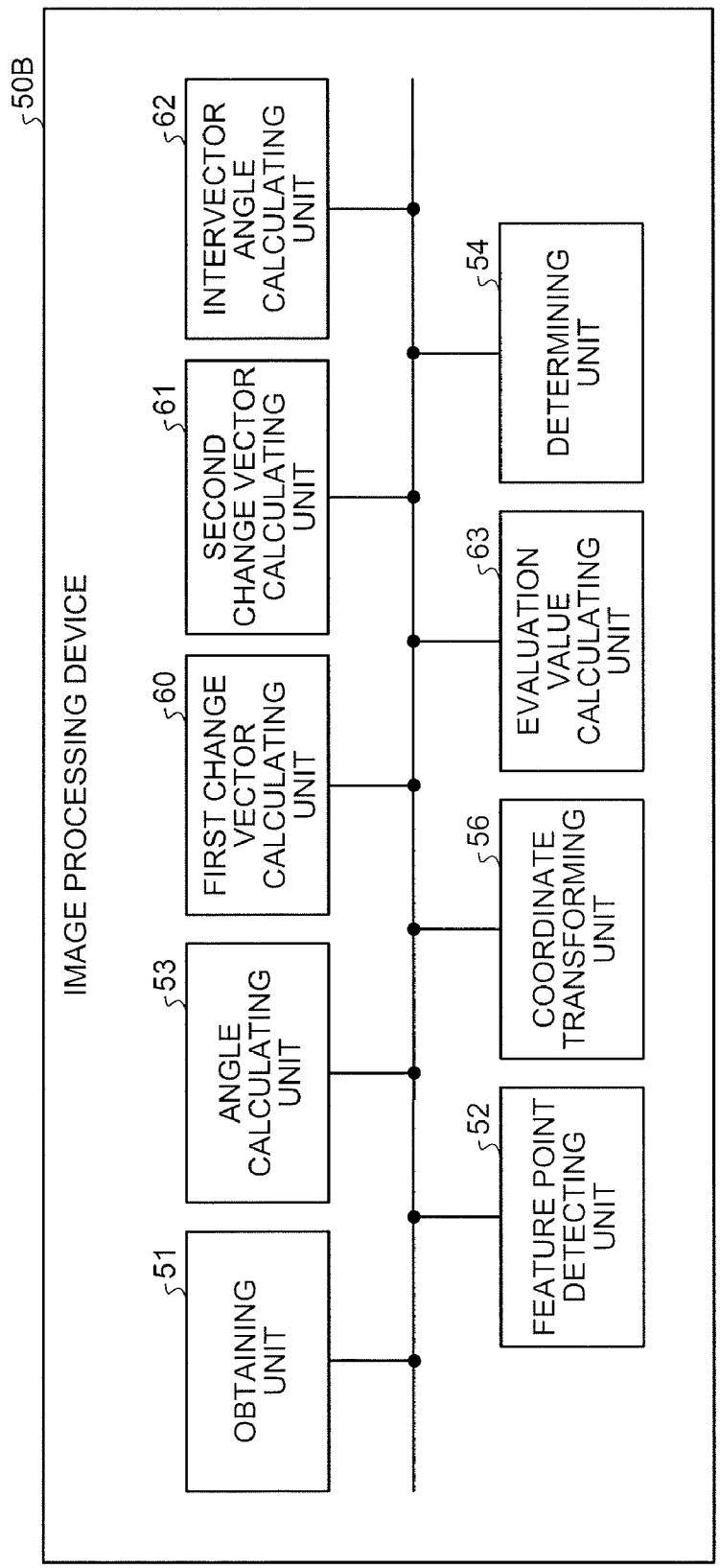
FIG. 11 is a diagram illustrating a configuration of an image processing device according to a third embodiment.

In the third embodiment, at least three facial feature points on the face center line are used, and relative coordinates obtained by transforming image coordinates to other coordinates are also used as the coordinates of the facial feature points. FIG. 11 is a diagram illustrating a configuration of an image processing device 50B according to the third embodiment. The configuration of the image processing device 50B according to the third embodiment is different from that of the image processing device 50 according to the first embodiment described above in the following respects. The image processing device 50B further includes a coordinate transforming unit 56 and an evaluation value calculating unit 63 in addition to the obtaining unit 51, the feature point detecting unit 52, the angle calculating unit 53, the first change vector calculating unit 60, the second change vector calculating unit 61, the intervector angle calculating unit 62 and the determining unit 54. The configurations of the obtaining unit 51, the angle calculating unit 53, the first change vector calculating unit 60 and the intervector angle calculating unit 62 are similar to those in the first embodiment. The feature point detecting unit 52 detects facial feature points from images obtained by the obtaining unit 51 in the same manner as in the first embodiment described above. However, depending on the feature point to be obtained, a facial feature point may be obtained by calculating using coordinates of other facial feature points. For example, the midpoint of the inner corners of the eyes can be obtained as an average position of coordinates of inner corners of left and right eyes, and the glabella can be obtained as the midpoint of coordinates of inner ends of left and right eyebrows.

The coordinate transforming unit 56 performs coordinate transformation by parallel translation, rotation and expansion (four degrees of freedom in total) so that coordinates of two specific facial feature points become (0, 0) and (0, 1) by using the coordinates of the facial feature points included in the feature point information output from the feature point detecting unit 52, obtains coordinates of the facial feature points resulting from the transformation and outputs the obtained coordinates as relative coordinates. For example, if four facial feature points of the glabella, the midpoint of inner corners of the eyes, the tip of the nose, the midpoint of the mouth as illustrated in FIG. 9 are used, coordinate transformation is performed by parallel translation, rotation and expansion (four degrees of freedom in total) so that coordinates of the glabella become (0, 0) and coordinates of the mouth midpoint become (0, 1), and relative coordinates of the midpoint of inner corners of eyes and the tip of the nose resulting from the transformation are obtained. Relative movements of positions are as described referring to FIG. 10.

The second change vector calculating unit 61 calculates a change vector representing a temporal change of the coordinates of the facial feature points using the relative coordinates of the facial feature points output from the coordinate transforming unit 56. The evaluation value calculating unit 63 calculates an evaluation value that is a larger value as the intervector angle calculated by the intervector angle calculating unit 62 is smaller. The determining unit 54 determines that what is captured in the images obtained by the obtaining unit 51 is a three-dimensional human face rather than a photograph if the evaluation value calculated by the evaluation value calculating unit 63 is larger than a predetermined third threshold, and outputs the determination result. Specifically, the determining unit 54 determines that what is captured in the images by the image input unit is a three-dimensional human face rather than a photograph if the change in the relative coordinates of the facial feature points between different face orientation angles is larger than the predetermined third threshold.

Figure 12:
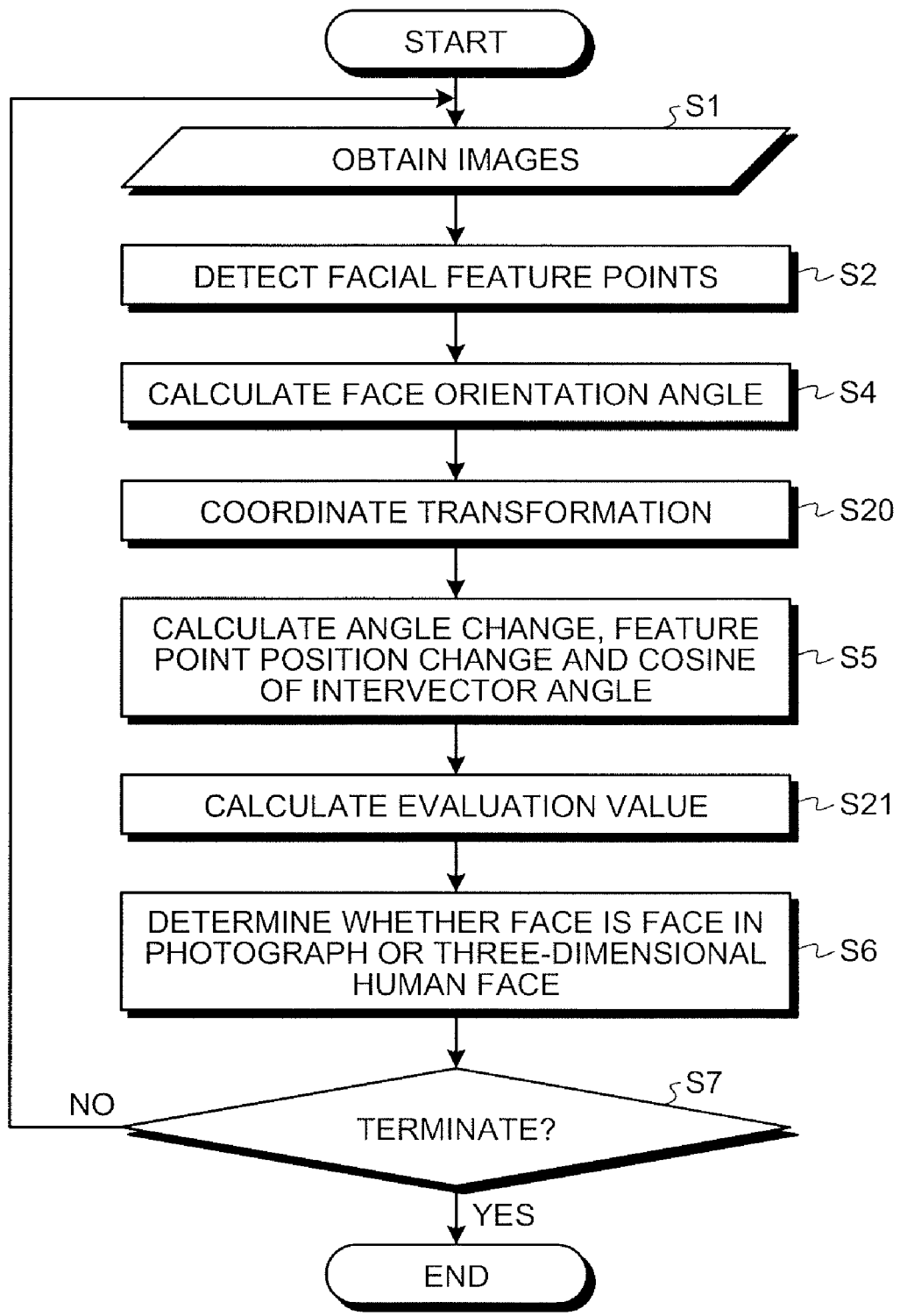
FIG. 12 is a flowchart illustrating procedures of an impersonation detection process.

Next, procedures of an impersonation detection process performed by the image processing device 50B according to the third embodiment will be described referring to FIG. 12. Steps S1, S2 and S4 are the same as those in the first embodiment described above. Note that the feature point detecting unit 52 outputs information of the coordinates representing the position of the face region, the size thereof and the coordinates representing the positions of the facial feature points in step S2. In step S20, the coordinate transforming unit 56 performs coordinate transformation by parallel translation, rotation and expansion (four degrees of freedom in total) so that coordinates of two specific facial feature points become (0, 0) and (0, 1) by using the coordinates of the facial feature points output in step S2, and outputs the relative coordinates of the facial feature points resulting from the transformation. In step S5, the first change vector calculating unit 60 calculates a change vector representing a temporal change of the face orientation angle using the face orientation angle calculated in step S4. The second change vector calculating unit 61 calculates a change vector representing a temporal change of the coordinates of the facial feature points using the relative coordinates of the facial feature points output in step S20. The intervector angle calculating unit 62 calculates an intervector angle between the change vector calculated by the first change vector calculating unit 60 and the change vector calculated by the second change vector calculating unit 61. In step S21, the evaluation value calculating unit 63 calculates an evaluation value that is a larger value as the intervector angle calculated in step S5 is smaller. In step S6, the determining unit 54 determines whether or not the evaluation value calculated in step S21 is larger than the predetermined third threshold, and if the evaluation value is larger than the predetermined third threshold, determines that what is captured in the images obtained in step S1 is a three-dimensional human face rather than a photograph, and outputs the determination result. Step S7 is the same as that in the first embodiment described above.

As described above, for analyzing the three-dimensional shape of a human face included in images captured by the image input unit, the facial feature points are transformed to relative coordinates, and what is captured in the images is determined to be a three-dimensional human face rather than a photograph if the change in the relative coordinates between different face orientation angles is large. With such a configuration, it is possible to perform the discrimination by using at least three facial feature points.

Fourth Embodiment

Next, a fourth embodiment of an image processing device and method will be described. Parts that are the same as those in the first embodiment to the third embodiment described above will be described using the same reference numerals or description thereof will not be repeated.

Figure 13:
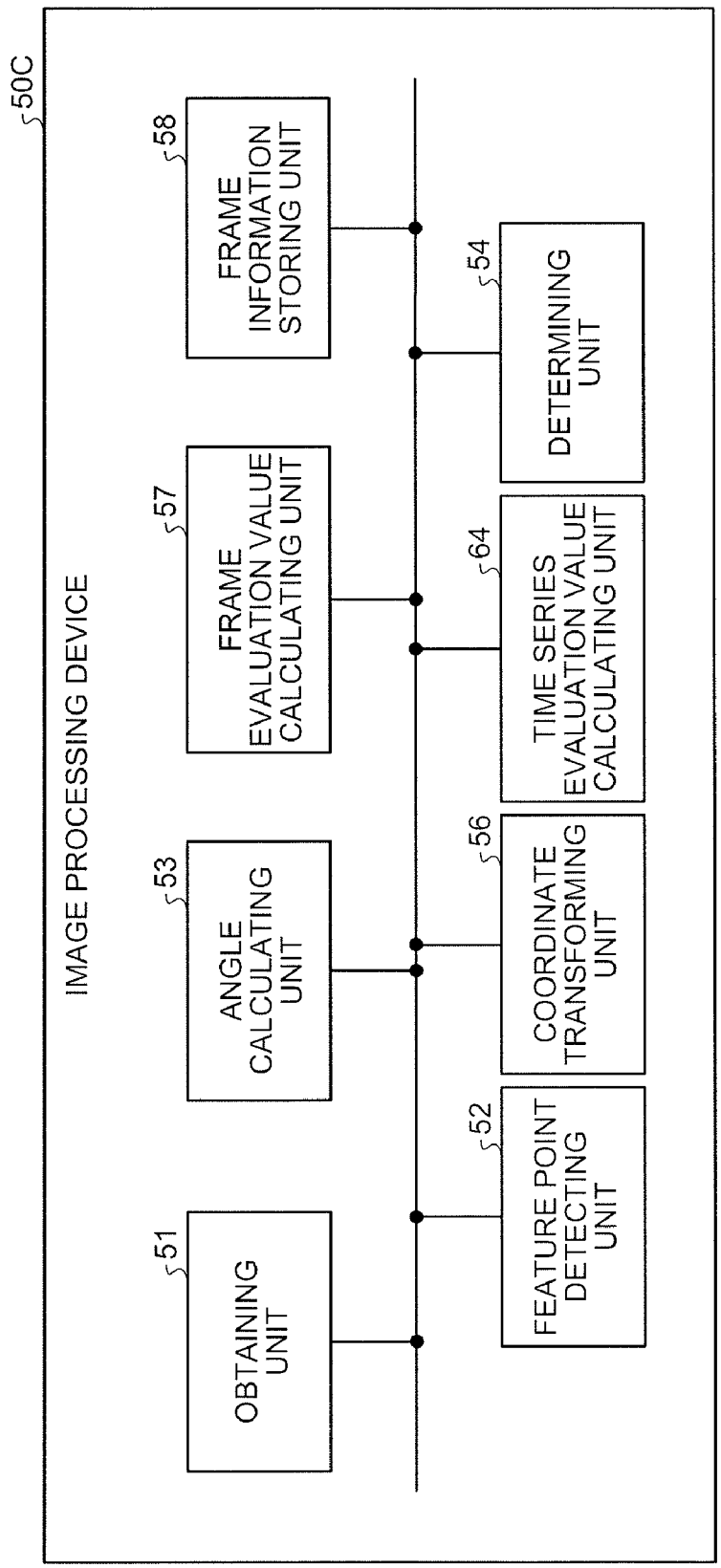
FIG. 13 is a diagram illustrating a configuration of an image processing device according to a fourth embodiment.

In the fourth embodiment, an evaluation value, which is calculated by a function to which a plurality of intervector angles at different times or different facial feature points is input, is used to determine whether images captured by the image input unit show a photograph or a three-dimensional human face. FIG. 13 is a diagram illustrating a configuration of an image processing device 50C according to the fourth embodiment. The configuration of the image processing device 50C according to the fourth embodiment is different from that of the image processing device 50B according to the third embodiment described above in the following respects. The image processing device 50C further includes a frame evaluation value calculating unit 57, a frame information storing unit 58 and a time series evaluation value calculating unit 64 in addition to the obtaining unit 51, the feature point detecting unit 52, the angle calculating unit 53, the determining unit 54 and the coordinate transforming unit 56. The configurations of the obtaining unit 51, the feature point detecting unit 52, the angle calculating unit 53, and the coordinate transforming unit 56 are similar to those in the third embodiment.

The frame information storing unit 58 stores therein histories of frame information calculated for respective frames in association with frame numbers in time series. Frame information includes the feature point information output from the feature point detecting unit 52, the face orientation angles calculated by the angle calculating unit 53, the relative coordinates of the facial feature points obtained by transformation by the coordinate transforming unit 56, and an evaluation value calculated by the frame evaluation value calculating unit 57, which will be described later. The feature point information is stored by the feature point detecting unit 52, the face orientation angles are stored by the angle calculating unit 53, the relative coordinates of the facial feature points are stored by the coordinate transforming unit 56, and the evaluation value is stored by the frame evaluation value calculating unit 57. The frame information storing unit 58 also stores therein, for each frame to be processed (processing target frame), a frame number of a frame (relevant previous frame) that is a previous processing target frame referred to by the frame evaluation value calculating unit 57 for calculating the evaluation value as will be described later and fulfills a search condition similar to that in the second embodiment and a frame number of a frame (intermediate frame) that is a frame between the processing target frame and the relevant previous frame on time series and fulfills an identifying condition similar to that in the second embodiment.

The frame evaluation value calculating unit 57 is configured to calculate an evaluation value for the processing target frame. The frame evaluation value calculating unit 57 calculates the evaluation value by using the face orientation angles calculated by the angle calculating unit 53, the relative coordinates of the facial feature points obtained by transformation by the coordinate transforming unit 56 and the frame information for the relevant previous frame and the frame information for the intermediate frame stored in the frame information storing unit 58. Details of the method for calculating the evaluation value will be described later. The frame evaluation value calculating unit 57 also stores the evaluation value calculated for the processing target frame in association with the frame number in the frame information storing unit 58.

The time series evaluation value calculating unit 64 calculates a time series evaluation value that is an evaluation value for a time series of a plurality of frames by using the evaluation value calculated for the processing target frame by the frame evaluation value calculating unit 57 and evaluation values for a plurality of previous frames stored in the frame information storing unit 58. This is to assume that a plurality of face images are obtained by capturing face images of the same person continuously for a given amount of time with gradual changes at most and determine whether or not one time series of the face images shows a human or a photograph.

The determining unit 54 determines that what is captured in the images obtained by the obtaining unit 51 is a three-dimensional human face if the time series evaluation value calculated by the time series evaluation value calculating unit 64 is larger than a predetermined fourth threshold, or determines that what is captured in the images obtained by the obtaining unit 51 is a photograph if the time series evaluation value is equal to or smaller than the fourth threshold, and outputs the determination result and the time series evaluation value.

Next, procedures of an impersonation detection process performed by the image processing device 50C according to the fourth embodiment will be described referring to FIG. 14. Steps S1, S2 and S4 are the same as those in the first embodiment described above. Note that the feature point detecting unit 52 outputs feature point information that is information of the coordinates representing the position of the face region, the size thereof and the coordinates representing the positions of the facial feature points, and stores the feature point information in association with the frame number in the frame information storing unit 58 in step S2. In addition, after calculating the face orientation angle for the processing target frame, the angle calculating unit 53 stores the face orientation angle in association with the frame number in time series in the angle information storing unit 55 in step S4. In step S30, the frame evaluation value calculating unit 57 refers to the frame information stored in association with the frame numbers in the frame information storing unit 58 and searches for the relevant previous frame according to the search condition described above. If such a relevant previous frame is not present, the process returns to step S1. If a relevant previous frame is present, the frame evaluation value calculating unit 57 refers to frame information stored in association with the frame numbers in the frame information storing unit 58, and identifies an intermediate frame according to the identifying condition described above in step S31. In this manner, the frame evaluation value calculating unit 57 searches for the relevant previous frame for the present processing target frame, identifies the intermediate frame and stores the frame numbers thereof in the frame information storing unit 58.

In step S32, the coordinate transforming unit 56 outputs relative coordinates of the facial feature points for the processing target frame in the same manner as in the third embodiment described above, and further stores the relative coordinates in association with the frame number in the frame information storing unit 58. In step S33, the frame evaluation value calculating unit 57 calculates the evaluation value for the processing target frame by using the face orientation angle calculated for the processing target frame by the angle calculating unit 53, the relative coordinates of the facial feature points output for the processing target frame by the coordinate transforming unit 56, and the face orientation angles and the relative coordinates of the feature points stored in association with the frame numbers for the relevant previous frame and the intermediate frame in the frame information storing unit 58.

The method for calculating the evaluation value by the frame evaluation value calculating unit 57 will be described in detail here. In the fourth embodiment, in relation to FIG. 8, a vector of the face orientation angle in the processing target frame is represented by $a_0$, a vector of the relative coordinates of a facial feature point (such as the midpoint of inner corners of the eyes) in the processing target frame is represented by $x_0$, a vector of the face orientation angle in the intermediate frame is represented by $a_1$, a vector of the relative coordinates of the facial feature point in the intermediate frame is represented by $x_1$, a vector of the face orientation angle in the relevant previous frame is represented by $a_2$, and a vector of the relative coordinates of the facial feature point in the relevant previous frame is represented by $x_2$ as expressed by the equations (35) and (36). A change vector $u_i$ of the face orientation angle is defined by an equation (37), and a change vector $v_i$ of the relative coordinates of the facial feature point is defined by an equation (38). Furthermore, vectors obtained by normalizing norms of the change vector $u_i$ of the face orientation angle and the change vector $v_i$ of the relative coordinates of the facial feature point to "1" are represented by $u'_i$ and $v'_i$, respectively, and defined by equations (39) and (40), respectively. Under the definitions described above, the frame evaluation value calculating unit 57 calculates a scalar product $s_1$ of $u'_0$ and $u'_1$ as an index indicating whether or not the change vector $u_i$ of the face orientation angle varies smoothly by an equation (41). The frame evaluation value calculating unit 57 also calculates a scalar product $s_2$ of $v'_0$ and $v'_1$ as an index indicating whether or not the change vector $v_i$ of the facial feature point varies smoothly by an equation (42). Furthermore, the frame evaluation value calculating unit 57 calculates two scalar products of the change vector $u_i$ of the face orientation angle and the change vector $v_i$ of the relative coordinates of the facial feature point as indices indicating the three-dimensional property of the subject by equations (43) and (44), and the obtained scalar products are represented by $s_3$ and $s_4$. The frame evaluation value calculating unit 57 then calculates a scalar product of a weight vector w set appropriately in advance and a feature quantity vector s having the scalar products $s_1$, $s_2$, $s_3$ and $s_4$ as components by an equation (45), and uses the calculation result as the evaluation value of the processing target frame. If the evaluation value that is expressed by the equation (45) and calculated by a function to which a plurality of intervector angles at different times or different facial feature points is input is small, the images obtained in step S1 are likely to show a photograph.

$$a_i = \begin{bmatrix} a_{x,i} \\ a_{y,i} \end{bmatrix}, (i = 0, 1, 2), \quad (35)$$

$$x_i = \begin{bmatrix} x_i \\ y_i \end{bmatrix}, (i = 0, 1, 2), \quad (36)$$

$$u_i = a_i - a_{i+1} \ (i = 0, 1), \quad (37)$$

$$v_i = x_i - x_{i+1} \ (i = 0, 1), \quad (38)$$

$$u'_i = \frac{u_i}{\|u_i\|}, (i = 0, 1), \quad (39)$$

$$v'_i = \frac{v_i}{\|v_i\|}, (i = 0, 1), \quad (40)$$

$$\text{Input } 1 = s_1 = u'_0 \cdot u'_1, \quad (41)$$

$$\text{Input } 2 = s_2 = v'_0 \cdot v'_1, \quad (42)$$

$$\text{Input } 3 = s_3 = u'_0 \cdot v'_0, \quad (43)$$

$$\text{Input } 4 = s_4 = u'_1 \cdot v'_1, \quad (44)$$

$$\text{Evaluation value} = h(s) = w \cdot s = \sum_{i=1}^{n_s} w_i s_i \quad (45)$$

Figure 14:
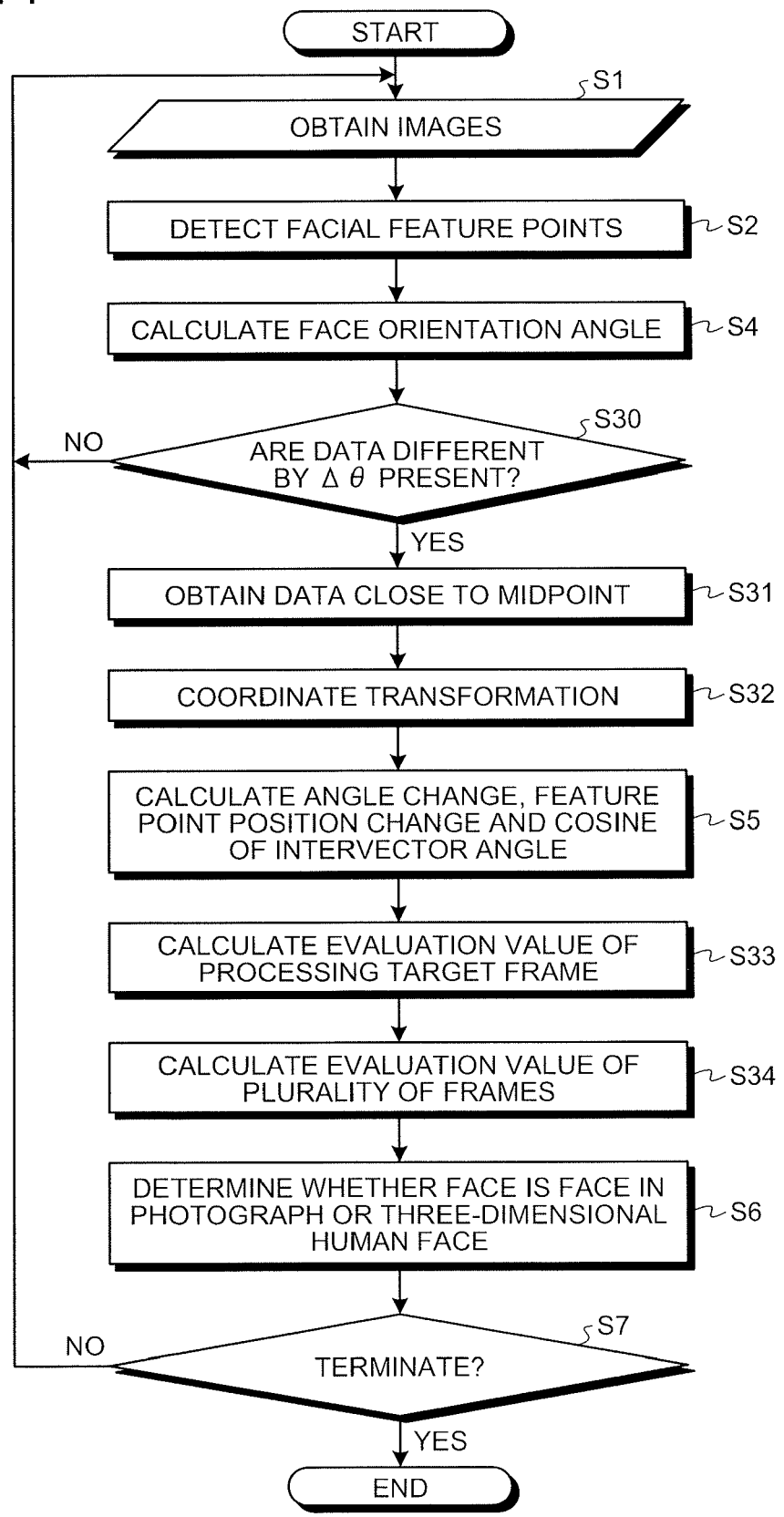
FIG. 14 is a flowchart illustrating procedures of an impersonation detection process.

The description refers back to FIG. 14. The frame evaluation value calculating unit 57 calculates the evaluation value as described above and stores the evaluation value in the frame information storing unit 58 in step S33. In step S34, the time series evaluation value calculating unit 64 calculates a time series evaluation value that is an evaluation value for a time series of the processing target frame by using the evaluation value calculated for the processing target frame by the frame evaluation value calculating unit 57 and evaluation values for a plurality of previous frames other than the processing target frame stored in the frame information storing unit 58. Then, the determining unit 54 determines whether or not the calculated time series evaluation value is larger than the predetermined fourth threshold, determines that what is captured in the images obtained in step S1 is a three-dimensional human face if the time series evaluation value is larger than the fourth threshold, or determines that what is captured in the images obtained in step S1 is a photograph if the time series evaluation value is equal to or smaller than the fourth threshold, and outputs the determination result and the time series evaluation value. Step S7 is the same as that in the first embodiment described above.

As described above, it is possible to determine whether what is captured in the images is a photograph or a three-dimensional human face more accurately by using the evaluation value calculated by the function to which a plurality of intervector angles at different times or different facial feature points is input in analyzing the three-dimensional shape of a human face included in images captured by the image input unit.

The present invention is not limited to the embodiments presented above, but may be embodied with various modified components in implementation without departing from the spirit of the invention. Further, the invention can be embodied in various forms by appropriately combining a plurality of components disclosed in the embodiments. For example, some of the components presented in the embodiments may be omitted. Further, some components in different embodiments may be appropriately combined. In addition, various modifications as described below may be made.

In the embodiments described above, various programs executed by the image processing device 50, 50A, 50B or 50C may be stored on a computer system connected to a network such as the Internet, and provided by being downloaded via the network. The programs may also be recorded on a computer readable recording medium such as a CD-ROM, a flexible disk (FD), a CD-R and a digital versatile disk (DVD) in a form of a file that can be installed or executed, and provided as a computer readable recording medium having programs including a plurality of instructions that can be executed on a computer system.

In the third or fourth embodiment described above, the determining unit 54 may also determine that what is captured in the images obtained by the obtaining unit 51 is a three-dimensional human face rather than a photograph by using an intervector angle as in the first embodiment. Specifically, the determining unit 54 determines that what is captured in the images obtained by the obtaining unit 51 is a three-dimensional human face rather than a photograph if an intervector angle between a change vector indicating a temporal change of the face orientation angle and a change vector indicating a temporal change of the relative coordinates of the facial feature point, which are calculated by using the relative coordinates of the facial feature points output from the coordinate transforming unit 56 and the face orientation angles calculated by the angle calculating unit 53, is smaller than a predetermined fifth threshold, and outputs the determination result.

With such a configuration, determination on impersonation can also be performed by using at least three facial feature points.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device, comprising:
   an obtaining unit configured to obtain a plurality of images captured in time series;
   a first calculating unit configured to calculate a first change vector indicating a change between the images in an angle representing a posture of a subject included in each of the images;
   a second calculating unit configured to calculate a second change vector indicating a change in coordinates of a feature point of the subject;
   a third calculating unit configured to calculate an intervector angle between the first change vector and the second change vector; and
   a determining unit configured to determine that the subject is three-dimensional when the intervector angle is smaller than a predetermined first threshold.

2. The device according to claim 1, wherein
   the subject is a human face,
   the angle representing the posture is a face orientation angle obtained based on a rotation matrix obtained by multiplying a predetermined pseudo inverse matrix of a matrix composed of three-dimensional coordinates of the feature point by a matrix composed of coordinates of the feature point in the images,
   the first calculating unit calculates the first change vector that is a two-dimensional vector remaining as a result of excluding one component in an image plane from a three-dimensional rotational motion that is a temporal change of the rotation matrix, and
   the second calculating unit calculates the second change vector indicating a change in the feature point that is at least one of a left or right nostril, a midpoint of left and right nostrils and a tip of a nose.

3. The device according to claim 2, further comprising:
   a frame information storing unit configured to store therein the face orientation angle and the feature point; and
   a frame evaluation value calculating unit configured to calculate an evaluation value of the images, wherein
   the frame evaluation value calculating unit identifies the face orientation angle at which a magnitude of the first change vector calculated for an image to be processed is larger than a predetermined magnitude from a plurality of face orientation angles stored in the frame information storing unit, and identifies an image associated with the identified face orientation angle from the plurality of images, and
   the first calculating unit calculates the first change vector that is a two-dimensional vector remaining as a result of excluding one component in an image plane from a three-dimensional rotational motion that is a temporal change between the face orientation angle in the image to be processed and the face orientation angle in the identified image.

4. The device according to claim 1, further comprising:
   a detecting unit configured to detect coordinates of at least three feature points of the subject; and
   a fourth calculating unit configured to calculate relative coordinates of coordinates of one of the three feature points based on coordinates of other two of the feature points, wherein
   the subject is a human face,
   the angle representing the posture is a face orientation angle obtained based on a rotation matrix obtained by multiplying a predetermined pseudo inverse matrix of a matrix composed of three-dimensional coordinates of the feature points by a matrix composed of coordinates of the feature points in the images, and
   the determining unit determines that the subject included in the images is three-dimensional when a change in the relative coordinates of the feature points in the images with different face orientation angles is larger than a predetermined second threshold.

5. The device according to claim 4, wherein
   the detecting unit detects the coordinates of at least three feature points on a face center line of a human face that is the subject.

6. The device according to claim 4, wherein
   the second calculating unit calculates the second change vector indicating a change in the relative coordinates of the feature points of the subject between the plurality of images.

7. The device according to claim 4, further comprising:
   an evaluation value calculating unit configured to calculate an evaluation value by using a function to which a plurality of intervector angles at different times or different feature points are input, wherein
   the determining unit determines whether or not the subject included in the images is three-dimensional by using the evaluation value.

8. An image processing method comprising:
   obtaining a plurality of images captured in time series;
   calculating a first change vector indicating a change between the images in an angle representing a posture of a subject included in each of the images;
   calculating a second change vector indicating a change in coordinates of a feature point of the subject;
   calculating an intervector angle between the first change vector and the second change vector; and
   determining that the subject included in the images is three-dimensional when the intervector angle is smaller than a predetermined first threshold.

9. A computer program product comprising a nontransitory computer readable medium including programmed instructions, wherein the instructions, when executed by a computer, cause the computer to perform:
   obtaining a plurality of images captured in time series;
   calculating a first change vector indicating a change between the images in an angle representing a posture of a subject included in each of the images;
   calculating a second change vector indicating a change in coordinates of a feature point of the subject;
   calculating an intervector angle between the first change vector and the second change vector; and
   determining that the subject included in the images is three-dimensional when the intervector angle is smaller than a predetermined first threshold.

* * * * *